United States Patent

Kawatani

[11] Patent Number: 5,802,830
[45] Date of Patent: Sep. 8, 1998

[54] STEEL CORD AND STEEL RADIAL TIRE

[75] Inventor: Hiroshi Kawatani, Kitakami, Japan

[73] Assignee: Tokyo Rope Mfg. Co., Ltd., Tokyo, Japan

[21] Appl. No.: 645,649

[22] Filed: May 16, 1996

[30] Foreign Application Priority Data

May 18, 1995 [JP] Japan ............................... 7-120004

[51] Int. Cl.$^6$ .................................................. D02G 3/36
[52] U.S. Cl. ................................................ 57/212; 57/902
[58] Field of Search .................... 57/902, 212, 210, 57/211

[56] References Cited

U.S. PATENT DOCUMENTS

| | | | |
|---|---|---|---|
| 4,349,063 | 9/1982 | Kikuchi et al. | 57/902 X |
| 4,651,513 | 3/1987 | Dambre | 57/902 X |
| 4,690,191 | 9/1987 | Kawasaki | 57/902 X |
| 5,050,657 | 9/1991 | Umezawa | 57/902 X |
| 5,213,640 | 5/1993 | Ikehara | 57/902 X |
| 5,311,917 | 5/1994 | Ikehara et al. | 57/902 X |
| 5,321,941 | 6/1994 | Bollen et al. | 57/213 |
| 5,396,942 | 3/1995 | Ikehara et al. | 57/902 X |

FOREIGN PATENT DOCUMENTS

| | | | |
|---|---|---|---|
| 55-41353 | 10/1980 | Japan . | |
| 58-5302283 | 11/1983 | Japan . | |
| 2267257 | 11/1990 | Japan . | |
| 2294426 | 12/1990 | Japan . | |
| 328396 | 2/1991 | Japan . | |
| 404136282 | 5/1992 | Japan | 57/902 |
| 406010280 | 1/1994 | Japan | 57/902 |
| 406010282 | 1/1994 | Japan | 57/902 |

*Primary Examiner*—Daniel P. Stodola
*Assistant Examiner*—Tina R. Taylor
*Attorney, Agent, or Firm*—John P. White; Cooper & Dunham LLP

[57] ABSTRACT

The present invention relates to a steel cord comprising two core wires and five outer wires each having a diameter larger than that of each core wire and integrally twisted on the core wires, wherein a strand constituted by the five outer wires and the two core wires has an oblong cross-section.

10 Claims, 8 Drawing Sheets

STEEL CORD AND STEEL RADIAL TIRE

BACKGROUND OF THE INVENTION

1. Field of the Invention

The present invention relates to a steel cord used for a molded rubber product such as a steel radial tire or a conveyor belt, and a steel radial tire using the steel cord.

2. Description of the Related Art

A steel cord is used as a reinforcing material for a molded rubber product such as a steel radial tire or a conveyor belt. A typical example of this steel cord is a steel cord of a two-layer strand (3+6) structure described in Jpn. Pat. Appln. KOKAI Publication No. 5-302283. Three steel wires are twisted to form a core strand, and then six steel wires are twisted on the surface of the core strand to form an outer strand to obtain the above (3+6) steel cord. Two-layer strand steel cords of this type are classified into an SZ twist type steel cord in which the twisting direction of the core strand is opposite to that of the outer strand, and an SS twist type steel cord in which the twisting direction of the core strand is the same as that of the outer strand.

A conventional (3+6) steel cord has a low productivity and a high manufacturing cost because it requires two twisting steps. Especially, in the manufacture using a buncher (double twister), the core strand of an SZ twist type steel cord is untwisted in the cross twisting step. The wires must, therefore, be twisted in advance at a pitch smaller than that of a final cord, and the productivity becomes low.

In the (3+6) steel cord, rubber tends not to fill up to the central portion of a three-wire twisted strand, and a space tends to form in the central portion of the core. When the central portion of the core has such space, internal corrosion and fretting wear tend to occur, thereby considerably shortening the service life of the steel cord.

In the steel radial tire, a steel cord must have a breaking strength equal to or higher than a given level. When the cross-sectional area of the steel cord is increased to obtain a desired breaking strength, the arrangement pitch of the steel cords in the calender process excessively increases, and a larger number of steel cords cannot be arranged on a rubber sheet.

SUMMARY OF THE INVENTION

It is an object of the present invention to provide a steel cord having a high productivity, a desired breaking strength, and excellent rubber permeability.

It is another object of the present invention to provide a long-life steel radial tire reinforced with a steel cord almost free from internal corrosion and fretting wear.

A steel cord according to the present invention comprises two core wires and five outer wires each having a diameter larger than that of each core wire and integrally twisted on the core wires, wherein a strand constituted by the five outer wires and the two core wires has an oblong cross-section.

In this case, the strand constituted by the five outer wires and the two core wires has an elliptical cross-section. The ratio (dimension ratio) of the longer dimension to the shorter dimension of the ellipse preferably falls within the range of 1.10 to 2.00, and most preferably 1.20 to 1.40.

When the ratio is less than 1.10, the rubber permeability is degraded, and the core wires easily come out from the outer wires. However, when the ratio is larger than 2.00, the longer dimension of the ellipse increases to reduce the number of steel cords arranged on the rubber sheet. Up to the ratio of 1.40, a desired number of steel cords can be arranged on the rubber sheet, and a high strength level of the molded rubber product can be assured.

The core wires have substantially the same diameter, the outer wires also have substantially the same diameter, and the ratio (wire diameter ratio) of the diameter of the outer wire to that of the core wire preferably falls within the range of 1.45 to 2.25, and most preferably 1.60 to 2.12.

When the wire diameter ratio is lower than 1.45, the clearance between the outer wires excessively increases to cause a twisting error. On the other hand, when the wire diameter ratio is higher than 2.25, the clearance between the outer wires excessively decreases to degrade the rubber permeability. In addition, the effective cross-sectional area of the cord is reduced to short the breaking load.

The range of the wire diameter ratio is determined with reference to a case in which two core wires having the same diameter are twisted tightly together with five outer wires having the same diameter (i.e., the dimension ratio=1.0). For example, when the outer wire diameter is given as D (=0.370 mm), a core wire diameter d is obtained using equation (1) below, and the range of the wire diameter ratio can be set on the basis of the resultant diameter d (=0.130 mm). This corresponds to a state in which the wires are twisted tightly. An actual core wire diameter $D_1$ becomes larger than the diameter d:

$$d = (D/2) \times [1/\{\sin(360°/10)\}] - (D/2) \qquad (1)$$

Each constituent wire is preferably a high tensile steel wire having a tensile strength of 300 to 360 kgf/mm$^2$ because the tensile strength of the wire must be 300 kgf/mm$^2$ or more to obtain a desired breaking strength of the objective steel cord. When the tensile strength of the wire exceeds 360 kgf/mm$^2$, the wire becomes brittle and tends to break easily. In this case, a high tensile steel wire having a tensile strength of 330 to 340 kgf/mm$^2$ is particularly preferable.

Prior to simultaneous twisting of the outer and core wires, the preforming percentage of the outer wires is preferably set different from that of the core wires. When the outer and core wires having different preforming percentages are simultaneously twisted, the outer wires do not linearly contact the core wires, and rubber permeability with respect to the core portion can be improved.

To eliminate the above drawback of the two-layer strand steel cord, the present inventors have made extensive studies on a so-called bunched steel cord in which a plurality of wires are simultaneously twisted, and have found the following facts.

In the bunched type steel cord, since the core strand (or core wire) linearly contact the outer strand (or outer wire), the core strand tends to come out from the outer strand. Since the adjacent wires are in tight contact with each other, rubber tends not to sufficiently fill up to the interior of the core strand. Since the torque balance between the core and outer strands in the bunched type steel cord is not good, and the residual rotation torque of the core strand is very large, the rubber sheet warps near its cut surface or at the side far from the cut surface, and the sheet is distorted.

Based on these findings, the present inventors have made extensive studies on flat steel cords each of which uses two core wires and five outer wires and the preforming percentages (waving percentages) of which are variously changed. As a result, an appropriate outer wire preforming percentage is selected to obtain a bunched steel cord with a low linear contact ratio. At the same time, uniform simultaneous twisting can be realized. The resultant steel cord tends to be flat because the number of core wires is two, and rubber permeability can also be greatly improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

A few preferred embodiments of the present invention will be described with reference to the accompanying drawings.

Figure 1:
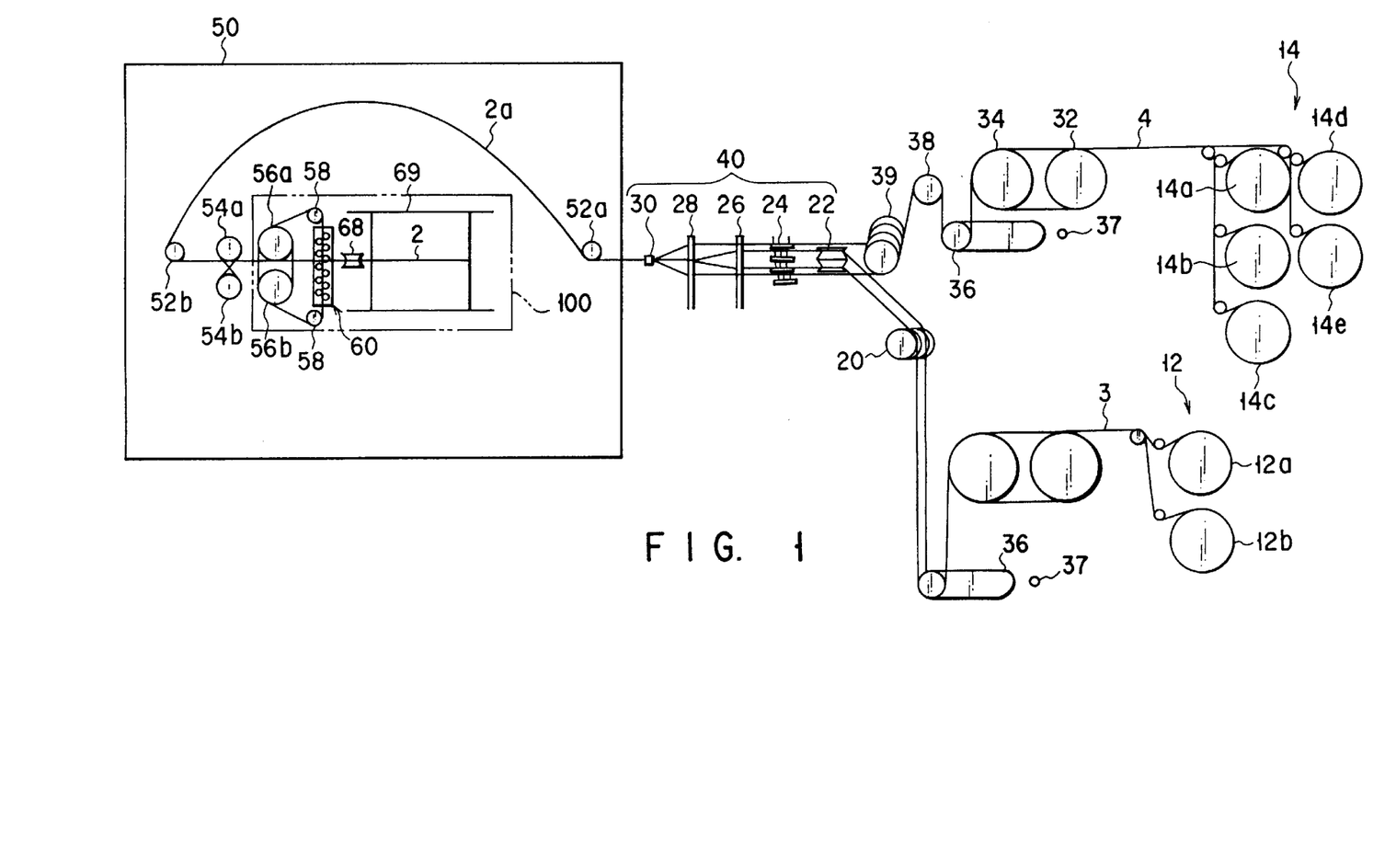
FIG. 1 is a schematic view showing an overall steel cord manufacturing line.

As shown in FIG. 1, a core wire supply unit 12 and an outer wire supply unit 14 are arranged upstream a steel cord manufacturing line. The core wire supply unit 12 has two bobbins 12a and 12b, and the outer wire supply unit 14 has five bobbins 14a to 14e. An alloy-plated steel wire 3 having a diameter of 0.20 mm is wound on each of the bobbins 12a and 12b. An alloy-plated steel wire 4 having a diameter of 0.37 mm is wound on each of the bobbins 14a to 14e. The wires 3 and 4 are plated with an alloy by a method described in Jpn. Pat. Appln. KOKAI Publication Nos. 3-28396 and 2-267257.

Figure 2A:
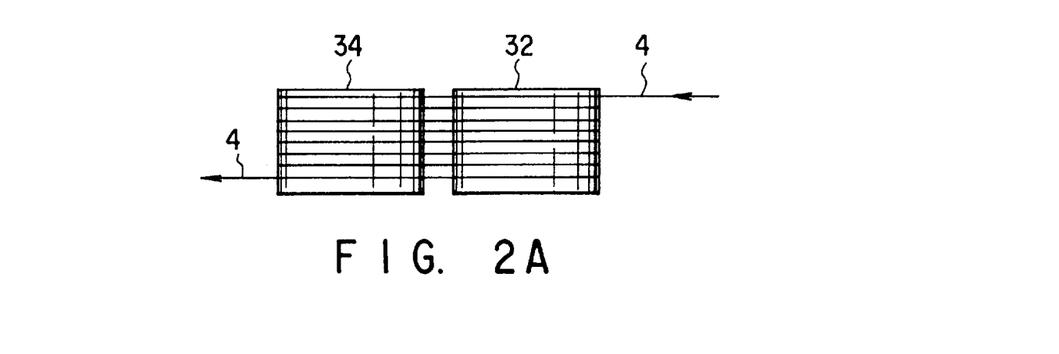
FIGS. 2A, 2B, and 2C are views illustrating wire tension control apparatuses, respectively.
Figure 2B:
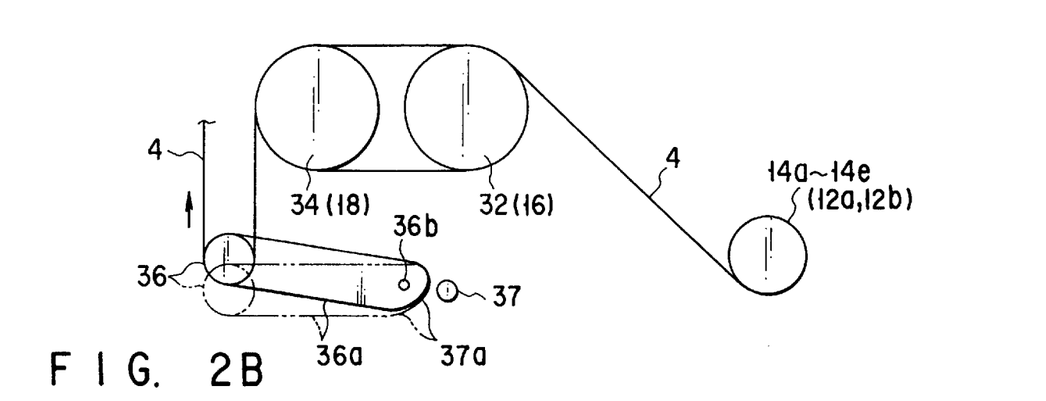
Figure 2C:
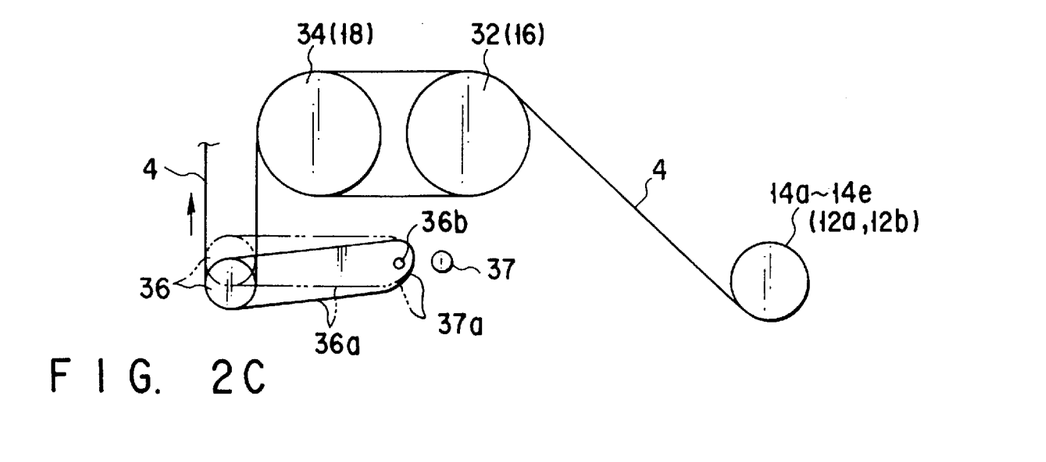

A tension equalizer is located immediately downstream the core wire supply unit 12. The tension equalizer has a powder brake 16 and a drive motor 18. When an appropriate frictional resistance force is applied to the wires 3 by the powder brake 16 while the wires 3 are drawn by the drive motor 18, over-feeding of the wires 3 can be prevented. Alternatively, the tension equalizer has a magnetic sensor 37, a detector 37a and a running block 36 with a swing arm 36a as shown in FIGS. 2A to 2C, and is adapted to feedback-control the tension of each wire 3. The arm 36a is supported by a shaft 36b such that it can swing.

Figure 4:
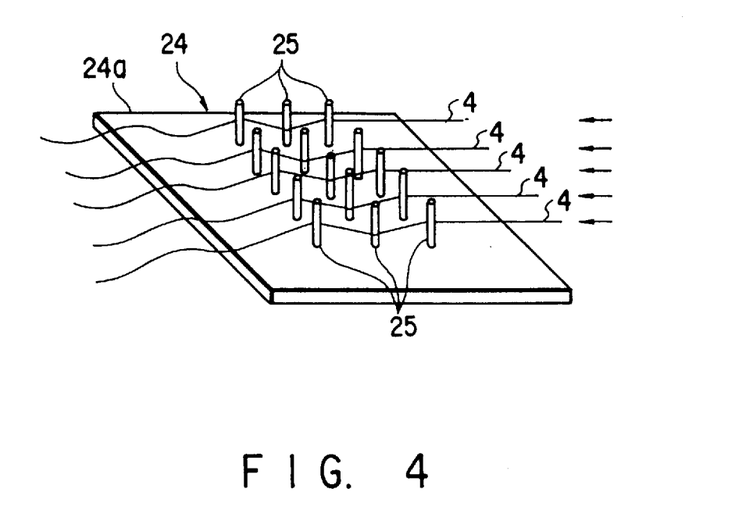
FIG. 4 is a view, showing a preformer for shaping a wire.

The two wires 3 are fed from the tension equalizer to a preformer 24 through guide rollers 20 and 22, and each of wires 3 is preformed (waved) by the preformer 24 as shown in FIG. 4.

A tension equalizer for controlling the wire tension will be described with reference to FIGS. 2A to 2C.

The tension equalizer is located immediately downstream the outer wire supply unit 14. This tension equalizer comprises a powder brake 32, a drive motor 34, the running block 36, the swing arm 36a, the detector 37a, and the sensor 37.

As shown in FIG. 2A, the wires 4 are looped between the drum of the powder brake 32 and the drum of the drive motor 34 so as to reciprocate between these drums a plurality of number of times. The powder brake 32 has its own brake mechanism, and rotation and braking of the drum of the powder brake 32 is controlled independently of the brake mechanism (bobbin brake) of the bobbins 14a to 14e.

The running block 36 and the sensor 37 are mounted immediately downstream the motor 34 to control the supplying speed of each wire 4. A counterweight (not shown) is attached to the running block 36 to apply a desired tension to each wire 4. A posture detection detector 37a is mounted at one end of the arm 36a of the running block 36. The detector 37a faces the magnetic sensor 37. The detector 37a has a detecting end portion with a cycloideal curved surface. The magnetic sensor 37 has a magnetic field generating circuit. The sensor 37 and the detector 37a are connected to the input side of a controller (not shown). When the swing arm 36a tilts with respect to the horizonal plane, the density of the magnetic flux of the magnetic field generated between the sensor 37 and the detector 37a varies, thereby sending a detection signal to the controller. When the running block 36 is located in the reference position and the swing arm 36a is set horizonal, no signal is sent from the sensor 37 and the detector 37a to the controller.

As shown in FIG. 2B, when the running block 36 moves above the reference position, and the arm 36a tilts with respect to the horizontal plane, a detection signal is sent from the sensor 37 and the detector 37a to the controller. The controller drives the motor 34 on the basis of this detection signal to accelerate feeding of the wires 4. The force currently acting on the wires 4 is mainly the rotational drive force of the motor 34. The powder brake 32 and the bobbin brake operate to keep the wires 4 taut with a small force. The running block 36 thus moves downward back to the reference position, and the arm 36a restores the horizontal posture.

As shown in FIG. 2C, when the running block 36 moves downward from the reference position, and the arm 36a tilts with respect to the horizontal plane, a detection signal is sent from the sensor 37 and the detector 37a to the controller. The controller reduces the rotational speed of the motor 34 on the basis of this detection signal, thereby reducing the feeding rate of the wires 4. The running block 36 thus moves upward back to the reference position, and the arm 36a returns to the horizontal posture. In this manner, the tension acting on the wires 4 is kept constant.

Guide rollers 38 and 39 are arranged downstream of the running block 36. Each wire is guided toward the preformer 24 of a horizontal unit 40. As shown in FIG. 4, the plate 24a of the preformer 24 has a plurality of wire guide pins 25. When the wires 3 and 4 pass through the corresponding wire guide pins 25, the wires 3 and 4 are preformed in the form of a desired wave.

Figure 8:
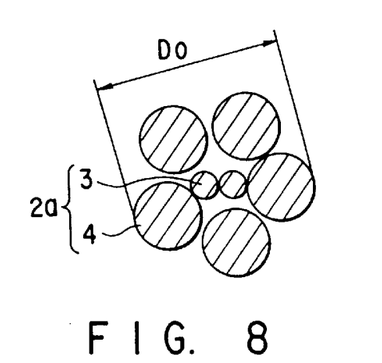
FIG. 8 is a cross-sectional view showing a steel cord (circular strand) prior to flattening.

The horizontal unit 40 has a first head plate 26, a second head plate 28, and a voice 30 which are arranged in this order. The first head plate 26, the second head plate 28, and the voice 30 are fixed on a foundation so as not to move. A double twister buncher (twister) 50 is arranged downstream the voice 30. When the two wires 3 pass through the second head plate 28, they are fed horizontally toward the voice 30. When the two wires 3 and the five wires 4 pass through the voice 30, they are twisted by the buncher 50 to form a (2/5) strand 2a. This (2/5) strand 2a has a substantially circular cross-section having a diameter $D_0$, as shown in FIG. 8.

The double twister buncher 50 has a cradle 100, and capstans 56a, 56b, a leveling roll assembly 60, and a takeup bobbin 69 are disposed in the cradle 100. The first and second turn rolls 52a and 52b are disposed on the same axis and rotated about this axis. The main body frame of the buncher 50 is rotatably supported on the frame by a pair of hollow spindles. A loop is wound on the pair of spindles. The first turn roll 52a is mounted on one spindle, and the second turn roll 52b is mounted on the other spindle. The first and second turn rolls 52a and 52b are rotated about the axis by the pair of spindles. Note that the strand 2a is fed from the first turn roll 52a to the second turn roll 52b so as to draw an arc.

The rotating axes of the first and second turn rolls 52a and 52b are respectively tilted at predetermined angles with respect to the horizontal plane. Note that the takeup bobbin 69 is disposed to keep a predetermined posture regardless of the rotation of the first and second turn rolls 52a and 52b about the common axis.

Over-twisters 54a and 54b, capstans 56a and 56b, a guide roll 58, a leveling roll assembly 60, and the takeup bobbin 69 are disposed between the first and second turn rolls 52a and 52b. The over-twisters 54a and 54b over-twist the strand 2a to cause plastic deformation of the waved wires 3 and 4.

Figure 3:
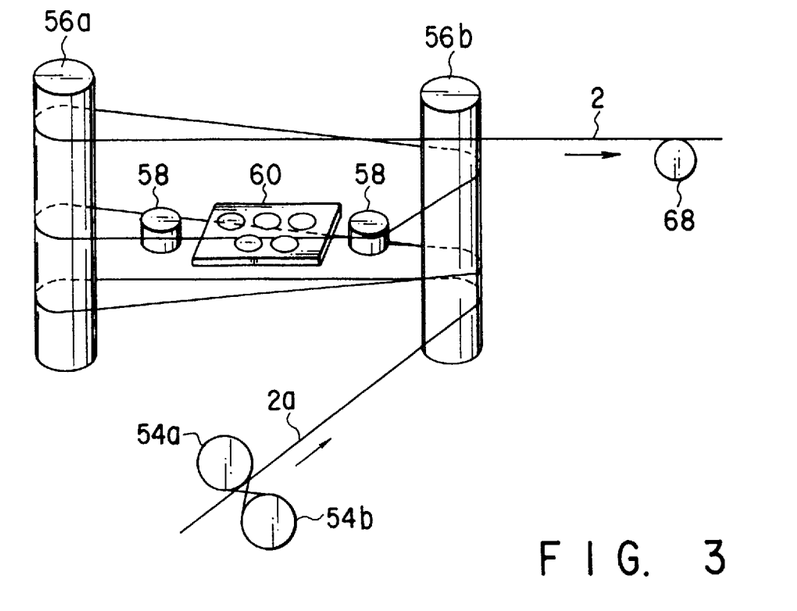
FIG. 3 is a schematic perspective view showing the layout relationship between the respective portions of a double twister.

As shown in FIG. 3, when the strand (wire bundle) 2a passes through the second turn roll 52b, it is over-twisted through the over-twisters 54a and 54b and reciprocates between the first capstan 56a and the second capstan 56b. The strand 2a then enters the leveling roll assembly 60 and reciprocates between the first and second capstans 56a and 56b. The strand 2a is then taken up by the takeup bobbin 69 through a traverser 68.

The leveling roll assembly 60 will be described with reference to FIGS. 5 to 7.

Figure 5:
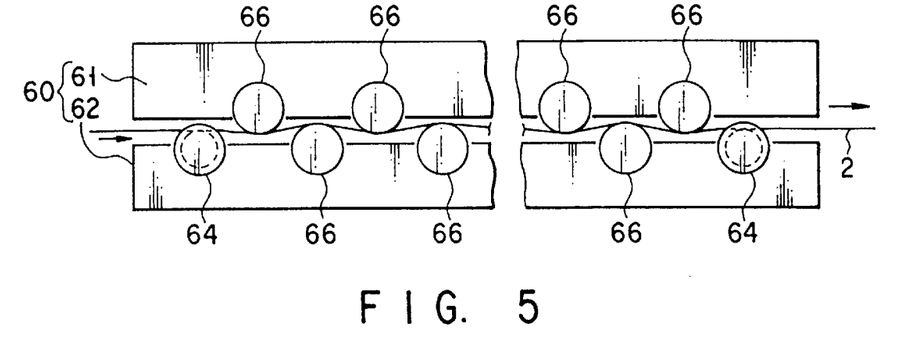
FIG. 5 is a schematic view showing a leveling roll assembly in the double twister.

As shown in FIG. 5, the leveling roll assembly 60 comprises roller units 61 and 62. The lower roller unit 62 is stationary, while the upper roller unit 61 is supported to be vertically movable by a compressor (not shown). The lower roller unit 62 has two guide rollers 64 and a large number of leveling rollers 66. The upper roller unit 61 has a large number of leveling rollers 66. The upper and lower rollers 64 and 66 are staggered from each other. The pitch between the staggered leveling rollers 66 preferably falls within the range of 0.7 times to 2.3 times of the roller diameter. In this embodiment, the diameter of each of the guide and leveling rollers 64 and 66 is 16 mm. The diameter of each of these rollers 64 and 66 preferably falls within the range of 10 mm to 20 mm.

Figure 6:
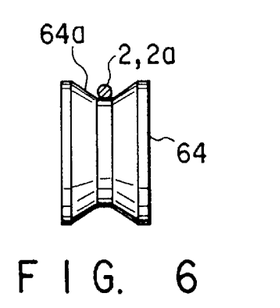
FIG. 6 is a view showing a guide roller arranged on each of the inlet and outlet sides of the leveling roll assembly.

As shown in FIG. 6, a V-groove 64a is formed in the circumferential surface of the guide roller 64. The strand 2a is guided along this V-groove 64a. The guide rollers 64 are disposed one each at the inlet and outlet sides of the strand 2a.

Figure 7:
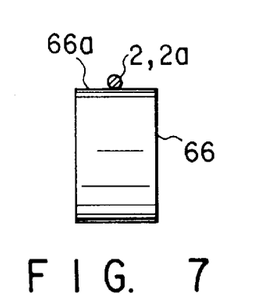
FIG. 7 is a view showing each intermediate roller in the leveling roll assembly.

As shown in FIG. 7, a circumferential surface 66a of the leveling roller 66 is flat. When the upper roller unit 61 is moved downward, the flat circumferential surface 66a of the leveling roller 66 is pressed against the strand 2a to obtain a flat strand 2. That is, as shown in FIG. 8, the strand 2a whose cross-sectional shape is substantially circular is pressed to obtain the strand 2 whose cross-sectional shape is elliptical, as shown in FIGS. 9 to 12. Note that when the strand 2a is pressed, the two core wires 3 do not jut outside the five outer wires 4 because the outer wires 4 are waved by the preformer 24 to apply an appropriate tension to the core wires 3. In this embodiment, the maximum waving height of the core wire 3 (diameter: 20 mm) is 0.54 mm, and the maximum waving height of the outer wire 4 (diameter: 0.37 mm) is 1.371. When non-waved outer wires 4 are fed to the leveling roll assembly 60, the core wires 3 jut outside the outer wires 4. As the maximum waving height of the outer wires 4 increases, and the tension of the core wires 3 increases, the core wires 3 are less likely to jut outside the outer wires 4.

The steel cords of Examples 1 and 2 will be evaluated with reference to FIGS. 9 to 21.

Example 1

Figure 9:
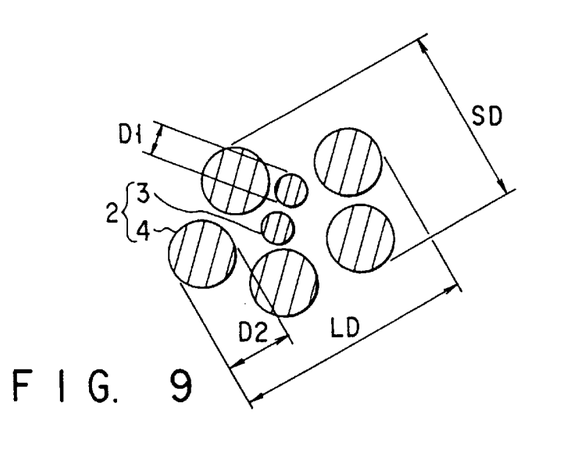
FIGS. 9 to 12 are cross-sectional views respectively showing steel cords according to the first embodiment of the present invention.
Figure 10:
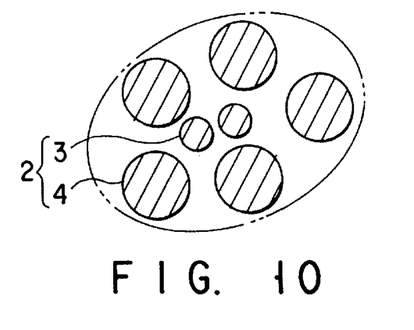
Figure 11:
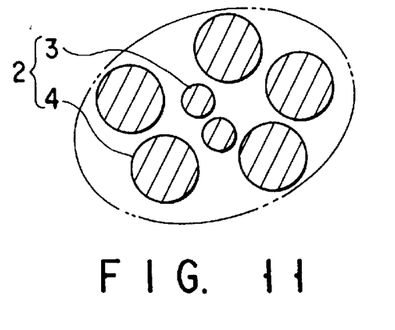
Figure 12:
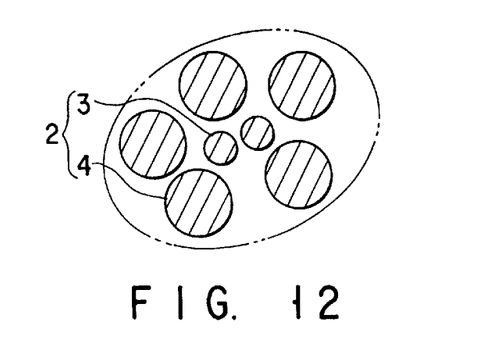

A steel cord 2 having a (1×7) structure shown in FIGS. 9 to 14 using a cradle type twister described in Jpn. Pat. Appln. KOKAI Publication No. 5-302283 was manufactured. FIG. 9 shows the cross-section of the cord at the reference point. FIG. 10 shows the cross-section of the cord at a position shifted from the reference point by a ¼ pitch. FIG. 11 shows the cross-section of the cord at a position shifted from the reference point by a ½ pitch. FIG. 12 shows the cross-section of the cord at a position shifted from the reference point by a ¾ pitch. The manufacturing conditions and the product size of Example 1 are shown below:

Tensile strength of wire: 335±5 kgf/mm$^2$

Diameter $D_1$ of core wire: 0.175 mm

Diameter $D_2$ of outer wire: 0.370 mm

Twisting pitch: 16 mm

Twisting direction: S twisting

Preforming percentage of core wire: 131.3%

Preforming percentage of outer wire: 110.4%

Flatness ratio: 1.30

Average major axis length LD of cord: 1.29 mm

Average minor axis length SD of cord: 0.99 mm

Breaking load of cord: 185.7 kgf/mm$^2$

Figure 13:
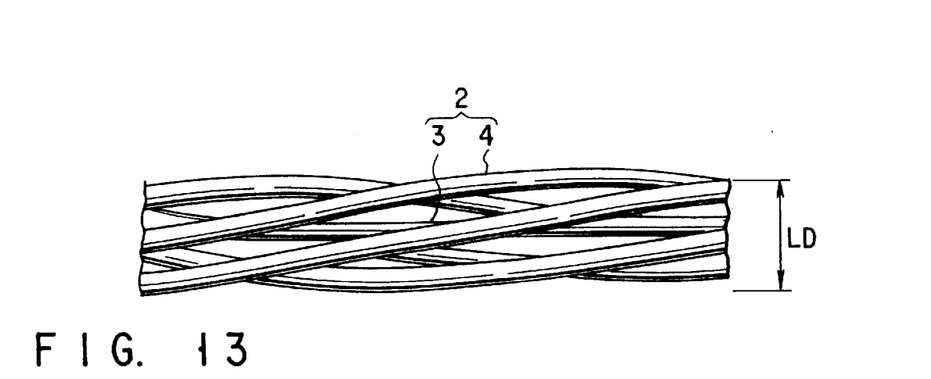
FIG. 13 is a perspective view of part of the steel cord of the first embodiment when viewed from a direction perpendicular to the major axis.
Figure 14:
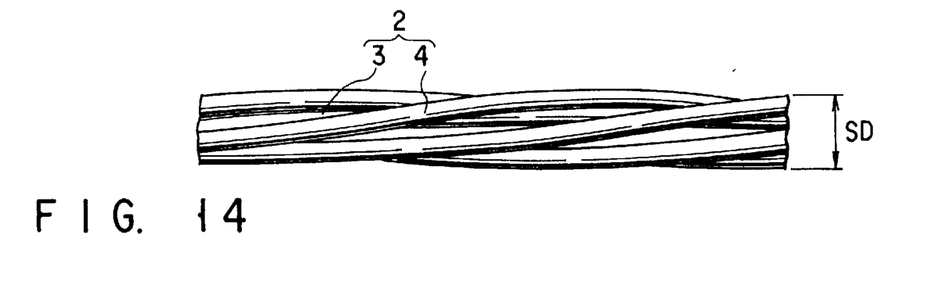
FIG. 14 is a perspective view of part of the steel cord of the first embodiment when viewed from a direction perpendicular to the minor axis.

A flat steel cord 2 having a major axis length LD and a minor axis length SD was obtained, as shown in FIGS. 9, 13, and 14. In the steel cord 2 of Example 1, the minor axis length SD could be much smaller than that of the (1×9) steel cord of a control when the average major axis lengths LD of the steel cords of Example 1 and the control were set equal to each other.

The (1×9) steel cord of the control is equivalent to the one obtained by simultaneously twisting three core wires and six outer wires to have a flat cross-section described in Jpn. Pat. Appln. KOKAI Publication No. 5-302283.

Example 2

Figure 15:
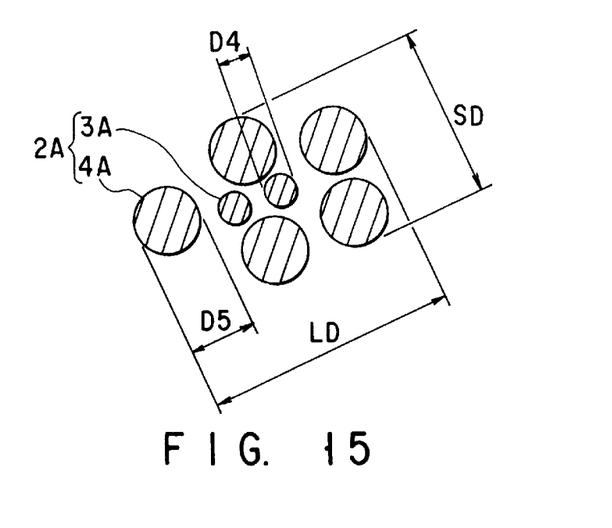
FIGS. 15 to 18 are cross-sectional views respectively showing steel cords according to the second embodiment of the present invention.
Figure 16:
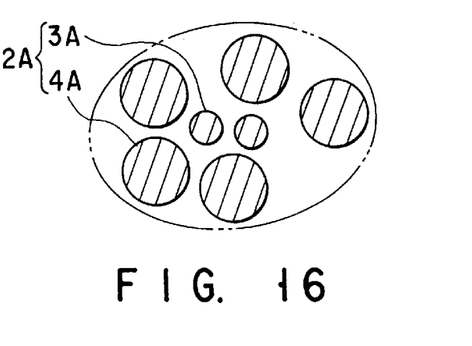
Figure 17:
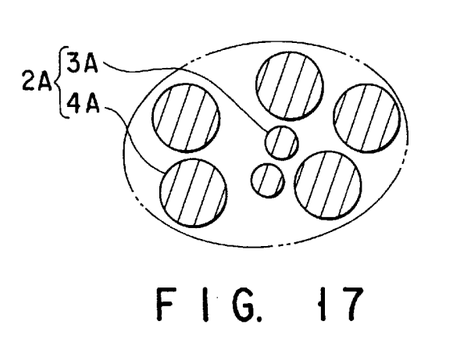
Figure 18:
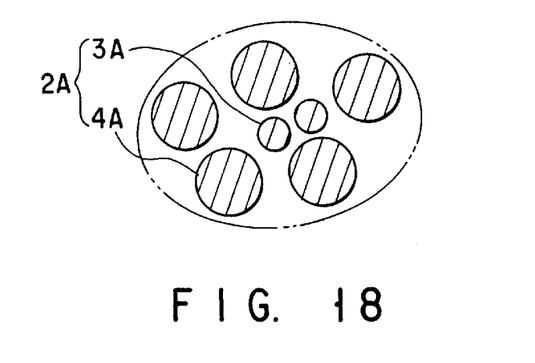

A (1×7) steel cord 2A shown in FIGS. 15 to 18 was manufactured using the same cradle twister as in Example 1. FIG. 15 shows the cross-section of the cord at the reference point. FIG. 16 shows the cross-section of the cord at a position shifted from the reference point by a ¼ pitch. FIG. 17 shows the cross-section of the cord at a position shifted from the reference point by a ½ pitch. FIG. 18 shows the cross-section of the cord at a position shifted from the reference point by a ¾ pitch.

The manufacturing conditions and the product size of Example 2 are shown below:

Tensile strength of wire: 335±5 kgf/mm$^2$

Diameter $D_1$ of core wire: 0.175 mm

Diameter $D_2$ of outer wire: 0.370 mm

Twisting pitch: 16 mm

Twisting direction: S twisting

Preforming percentage of core wire: 132.2%

Preforming percentage of outer wire: 125.0%

Flatness ratio: 1.33

Average major axis length LD of cord: 1.42 mm

Average minor axis length SD of cord: 1.07 mm

Breaking load of cord: 185.2 kgf/mm$^2$

Example 3

A (1×7) steel cord (not shown) of Example 3 was manufactured using the same cradle twister as in Examples 1 and 2.

The manufacturing conditions and the product size of Example 3 are shown below:

Tensile strength of wire: 335±5 kgf/mm$^2$

Diameter $D_1$ of core wire: 0.200 mm

Diameter $D_2$ of outer wire: 0.370 mm

Twisting pitch: 16 mm

Twisting direction: S twisting

Preforming percentage of core wire: 135.0%

Preforming percentage of outer wire: 112.8%

Flatness ratio: 1.34

Average major axis length LD of cord: 1.38 mm

Average minor axis length SD of cord: 1.03 mm

Breaking load of cord: 186.5 kgf/mm$^2$

Rubber permeability: 100% [

Evaluation of Rubber Permeability]

The rubber permeability of the steel cords 2 and 2A of Examples 1 and 2 and the steel cord of Example 3 was evaluated in comparison with a prior-art steel cord and the steel cord of the control. The prior-art steel cord was a (3+6) steel cord. A (1×9) steel cord having the flat cross-section described in Jpn. Pat. Appln. KOKAI Publication No. 5-302283 was used as the steel cord of the control.

20-pitch steel cord samples of Examples 1 to 3, the prior art, and the control were prepared. The outer wires were removed from each cord sample, and the rubber-filled state was visually inspected with the naked eye at a total of 40 positions consisting of upper and lower crest portions.

The visual inspection used scoring points. Scoring "5" for a portion perfectly filled with rubber, "2.5" for a portion half filled with rubber, and "0" for a portion not filled with rubber. The total scoring point for the 20 upper crest portions of each sample with respect to the maximum scoring point, "100" (=20×5), was calculated, and the total scoring point for the 20 lower crest portions of each sample with respect to the maximum scoring point, "100", was calculated. The resultant total scoring points were added and the sum was divided to obtain the average scoring point of each sample. The average scoring point with respect to the maximum scoring point was calculated in percentage, thereby evaluating the rubber permeability. A sample having a rubber permeability of 90% or more was determined as a non-defective steel cord.

The evaluation results of Examples 1 to 3, the control, and the prior art are shown below.

|  |  | Rubber Permeability of Core Portion (%) | Rubber Permeability of Outer Portion (%) |
| --- | --- | --- | --- |
| Examples: | (1 × 7) cords | 90–100 | 90–100 |
| Control: | (1 × 9) cord | 80–90 | 85–100 |
| Prior Art: | (3 + 6) cord | 30–50 | 80–95 |

The effects of Examples 1 to 3 will be described with reference to FIGS. 19 and 20.

Figure 19:
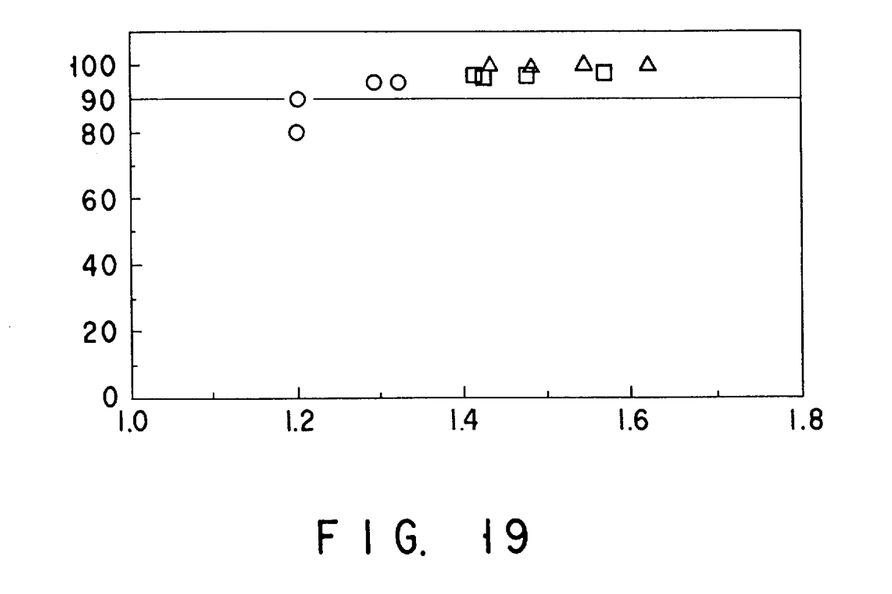
FIG. 19 is a graph showing the relationship between the major axis length and rubber permeability of each embodiment.

FIG. 19 is a graph showing the relationship between the major axis length (mm) (abscissa) and the rubber permeability (%) (ordinate).

Figure 20:
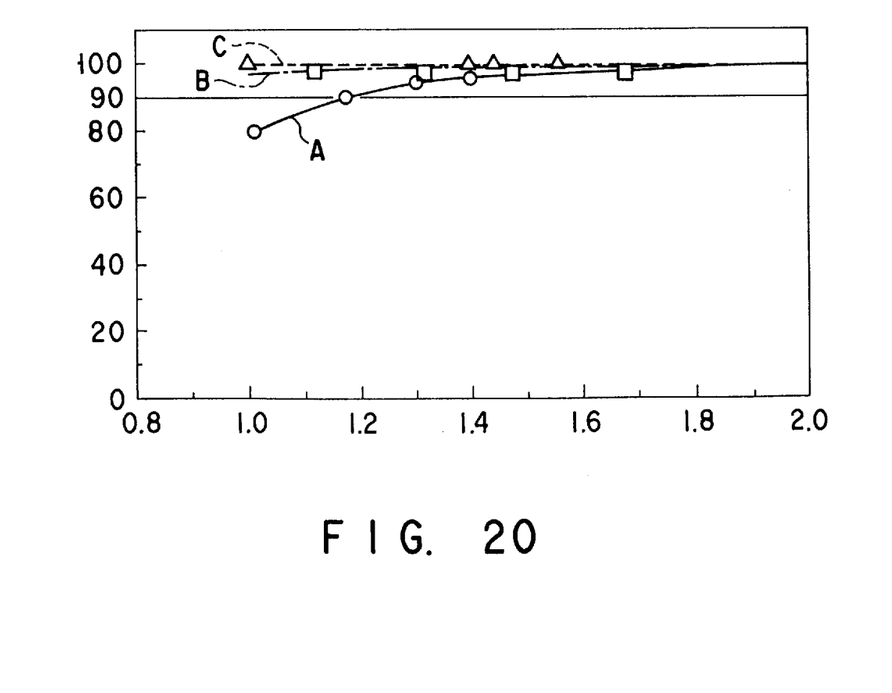
FIG. 20 is a graph showing the relationship between the flatness ratio and the rubber permeability of each embodiment.

FIG. 20 is a graph showing the relationship between the flatness ratio (abscissa) and the rubber permeability (%) (ordinate).

In each of FIGS. 19 and 20, circles (curve A) represent the result obtained when the preforming percentage of the outer wires is 110.4%, squares (curve B) represent the result obtained when the preforming percentage of the outer wires is 125.0%, and triangles (curve C) represent the result obtained when the preforming percentage of the outer wires is 137.0%. Note that the core wire diameter, the outer wire diameter, and the twisting pitch of the cord were set to be 0.175 mm, 0.370 mm, and 16 mm, respectively.

As can be apparent from FIGS. 19 and 20, as the preforming percentage of the outer wires increases, the rubber permeability improves. When the preforming percentage remains the same, the rubber permeability is found to improve with an increase in flatness ratio.

The manufacture of a steel radial tire for using truck or bus will be described with reference to FIGS. 21 to 23.

Figure 21:
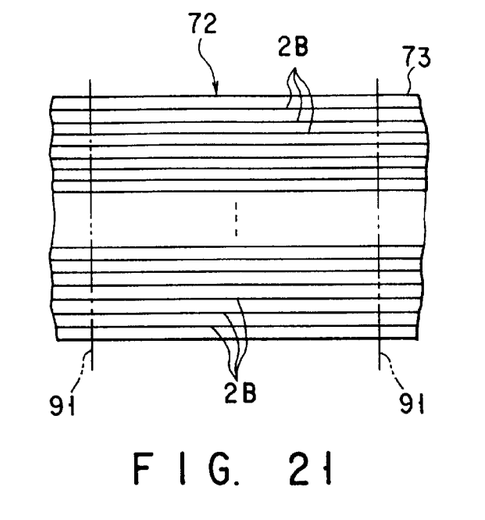
FIG. 21 is a plan view showing a calender sheet prior to cutting.

As shown in FIG. 21, other steel cords 2B are arranged substantially straight at equal intervals, and upper and lower crude rubber sheets 73 were adhered to sandwich the steel cords 2B, obtaining a carcass plate by this calendering. The carcass plate is cut every predetermined length along cutting lines 91. The cutting lines 91 are perpendicular to the longitudinal direction of the steel cords 2B. The non-cut end faces of the cut sheets are bonded to each other, and the resultant structure is used as a tire carcass 72. The carcass 72 is wound on the drum of a tire forming machine. A side wall 84 is formed together with side plies 76 and a bead filler 78. A steel wire is formed in a ring-like shape to form a bead 80. The side wall 84 is wound on the drum and bonded to the carcass 72. The resultant tire assembly is removed from the drum and set in the tire forming machine. The bead 80 is fitted on the two sides of the tire assembly, and the two ends of the carcass 72 are wound on the bead 80. Compressed air is supplied to inflate the tire assembly.

Figure 22:
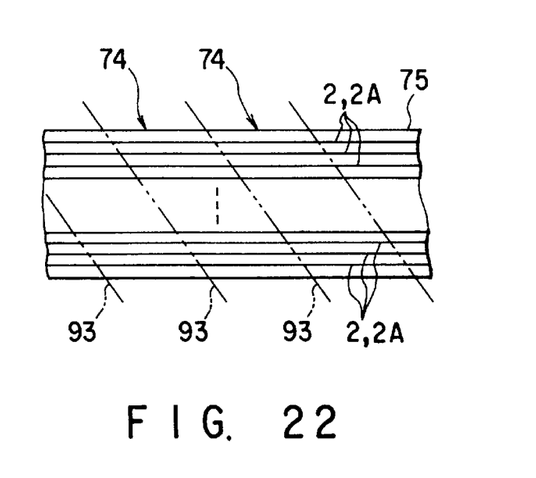
FIG. 22 is a plan view showing another calender sheet prior to cutting.
Figure 23:
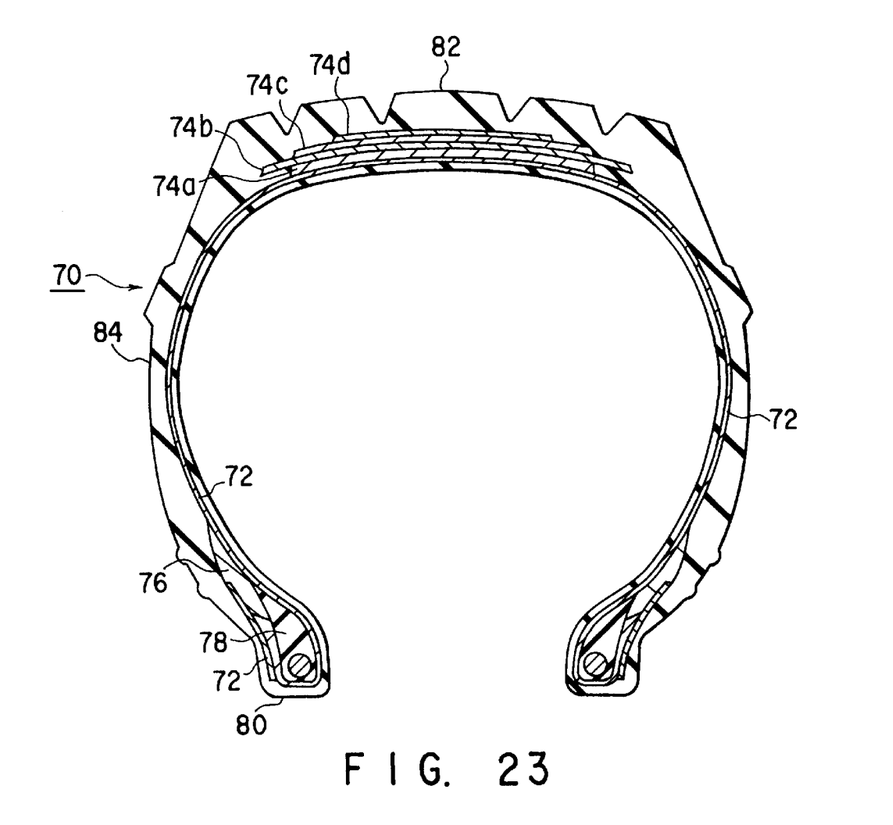
FIG. 23 is a cross-sectional view of a steel radial tire.

As shown in FIG. 22, steel cords 2 (2A) are arranged substantially straight at equal intervals, and upper and lower crude rubber sheets 75 are adhered to sandwich the steel cords 2 (2A), thereby forming a belt plate by this calendering. The belt plate is cut at various sizes along cutting lines 93. The cutting lines 93 are inclined with respect to the longitudinal direction of the steel cords 2 (2A). The resultant cut sheets are used as belts 74a to 74d. The belts 74a to 74d are sequentially adhered to the carcass of the tire assembly.

A synthetic rubber is extruded from a tread extractor and cooled. The cooled synthetic rubber is cut at a predetermined length to form a tread 82. The tread 82 is adhered to the outer circumferential surface of the tire assembly. The tire assembly is heated while being inflated under pressure to form a green tire having a predetermined shape. The green tire is vulcanized in a vulcanizer to cure the crude rubber. After a final inspection, a steel radial tire 70 shown in FIG. 23 is obtained.

In the steel radial tire of the present invention, since rubber sufficiently fills the core portion of the steel cord, the tire is free from fretting.

Since the steel cord of the present invention has a flat cross-section, the shape retention properties of the cord can be improved, and twisting between the core and outer strands tends not to occur. For this reason, the sheet hardly warps near the cut surface of the rubber sheet or at the side away from the cut surface.

Since the steel cord of the present invention has a structure in which two core wires are used and no space is formed in the core portion, the steel cord has excellent rubber permeability, and the rubber sufficiently fills up to the core portion.

The steel cord of the present invention can assure a sufficient arrangement pitch of the steel cords in the calender process without impairing the breaking strength. Therefore, a large number of steel cords can be arranged on rubber sheets.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A steel cord comprising:
   two core wires each preformed to have a preforming percentage Kc before a strand is formed, said two core wires having substantially the same diameter,
   five outer wires each having a diameter larger than that of each core wire and integrally twisted on said core wires,
   said five outer wires each being preformed to have a preforming percentage Ks before said strand is formed, said five outer wires also having substantially the same diameter, said strand being formed by said five outer wires and said two core wires, and having an oblong cross section; and
   rubber filled in a clearance between the two core wires and the five outer wires,
   wherein a ratio of a diameter of each of said outer wires to a diameter of each of said core wires falls within a range of about 1.45 to about 2.25, and the preforming percentage Kc of said two core wires is greater than the preforming percentage Ks of said five outer wires.

2. A steel cord according to claim 1, wherein said strand constituted by said five outer wires and said two core wires has a substantially elliptical cross-section, and a ratio of a longer dimension of the ellipse to a shorter dimension thereof falls within a range of 1.10 to 2.00.

3. A steel cord according to claim 1, wherein steel wires having a tensile strength falling within a range of 300 to 360 kgf/mm$^2$ are used as said core and outer wires.

4. A steel cord according to claim 1, wherein a small part of one of said two core wires contacts a small part of other of said two core wires, and a greater part of said one of said two core wires is separated from a greater part of said other of said two core wires.

5. A steel cord according to claim 1, wherein the preforming percentage Kc is about 131.3 to about 135%, and the preforming percentage Ks is about 110.4 to about 125%.

6. A steel radial tire reinforced with a steel cord, said steel cord comprising:
   two core wires each preformed to have a preforming percentage Kc before a strand is formed, said two core wires having substantially the same diameter,
   five outer wires each having a diameter larger than that of each core wire and integrally twisted on said core wires,
   said five outer wires each being preformed to have a preforming percentage Ks before said strand is formed, said five outer wires also having substantially the same diameter, said strand being formed by said five outer wires and said two core wires, and having an oblong cross section; and
   rubber filled in a clearance between the two core wires and the five outer wires,
   wherein a ratio of a diameter of each of said outer wires to a diameter of each of said core wires falls within a range of about 1.45 to about 2.25, and the preforming percentage Kc of said two core wires is greater than the preforming percentage Ks of said five outer wires.

7. A steel radial tire according to claim 6, wherein said strand constituted by said five outer wires and said two core wires has a substantially elliptical cross-section, and a ratio of a longer dimension of an ellipse to a minor axis length thereof falls within a range of 1.10 to 2.00.

8. A steel radial tire according to claim 6, wherein steel wires having a tensile strength falling within a range of 300 to 360 kgf/mm$^2$ are used as said core and outer wires.

9. A steel radial tire according to claim 6, wherein a small part of one of said two core wires contacts a small part of other of said two core wires, and a greater part of said one of said two core wires is separated from a greater part of said other of said two core wires.

10. A steel radial tire according to claim 6, wherein the preforming percentage Kc is about 131.3 to about 135%, and the preforming percentage Ks is about 110.4 to about 125%.

* * * * *